US009922624B2

(12) United States Patent
Pascucci et al.

(10) Patent No.: US 9,922,624 B2
(45) Date of Patent: Mar. 20, 2018

(54) COMPUTER INPUT DEVICE WITH SMART SCROLL

(71) Applicants: Antonio Pascucci, Seefeld (DE); Nuno Gomes, Torres Vedras (PT)

(72) Inventors: Antonio Pascucci, Seefeld (DE); Nuno Gomes, Torres Vedras (PT)

(73) Assignee: Societe Civile Galileo 2011 (MC)

( * ) Notice: Subject to any disclaimer, the term of this patent is extended or adjusted under 35 U.S.C. 154(b) by 23 days.

(21) Appl. No.: 14/645,133

(22) Filed: Mar. 11, 2015

(65) Prior Publication Data

US 2016/0180820 A1   Jun. 23, 2016

(30) Foreign Application Priority Data

Dec. 18, 2014 (EP) .................................... 14004291

(51) Int. Cl.
*G09G 5/34* (2006.01)
*G06F 3/0362* (2013.01)
(Continued)

(52) U.S. Cl.
CPC ............. *G09G 5/34* (2013.01); *G06F 3/0362* (2013.01); *G06F 3/0383* (2013.01); *G06F 3/03543* (2013.01); *G06F 3/0485* (2013.01)

(58) Field of Classification Search
CPC ........ G06F 3/03; G06F 3/0304; G06F 3/0312; G06F 3/033; G06F 3/0354;
(Continued)

(56) References Cited

U.S. PATENT DOCUMENTS 5,530,455 A * 6/1996 Gillick .................. G06F 3/0485
715/784
6,714,221 B1 * 3/2004 Christie ................ G06F 3/0485
715/784
(Continued)

FOREIGN PATENT DOCUMENTS

CN    101561741 A    * 10/2009

OTHER PUBLICATIONS

English translation of CN 101561741 A.*

*Primary Examiner* — Nathan Danielsen
(74) *Attorney, Agent, or Firm* — Tarolli, Sundheim, Covell & Tummino LLP

(57) ABSTRACT

An input system comprises a human machine interface device comprising a scroll device adapted to feed scroll pulses to a controller residing in the human machine interface device, for scrolling through contents on a display of a host computer. The controller is adapted and programmed to communicate with the host computer and adapted and programmed to sense, in a sequence of scroll pulses, elapsed time spans between each of a plurality of the scroll pulses resulting from a user operating a scroll device being a part of a human-machine interface device which is adapted to communicate with the host computer, and a direction of the operation of the scroll device by the user. The controller is further adapted and programmed to, upon sensing elapsed time spans following a first scroll pulse until a subsequent scroll pulse is sensed, carry out the following: identifying a 'single scroll' or a 'fast scroll', depending on the elapsed time between subsequent scroll pulses; upon identifying a 'single scroll', issuing a single scroll event by a controller residing in the human machine interface device to initiate a single scroll command in the host computer; the controller is also adapted and programmed to upon identifying a 'fast scroll', issuing a number of single scroll events by the controller of the human-machine interface device to initiate a respective number of scroll commands in the host computer with predetermined time spans between subsequent scroll events; wherein the number of single scroll events is based on a value stored in the human-machine interface device, and wherein the predetermined time spans between subsequent scroll events being defined by a function or table of time span values stored in the human-machine interface device, and, upon sensing a scroll pulse having a reversed (Continued)

direction of the operation of the scroll device or an operation of an input sensor of the human-machine interface device while issuing the number of single scroll events, immediately ceasing to issue any further single scroll events of the number of single scroll events by the controller of the human-machine interface device.

20 Claims, 2 Drawing Sheets

(51) Int. Cl.
    *G06F 3/0354*     (2013.01)
    *G06F 3/038*     (2013.01)
    *G06F 3/0485*     (2013.01)

(58) Field of Classification Search
    CPC .............. G06F 3/03543; G06F 3/03544; G06F 3/03548; G06F 3/0362; G06F 3/048; G06F 3/0484; G06F 3/0485; G06F 3/04855; G06F 2200/163; G06F 2200/1637; G06F 2203/0339; G06F 2203/04808; G09G 5/34–5/346

See application file for complete search history.

(56) References Cited

U.S. PATENT DOCUMENTS

| | | | |
|---|---|---|---|
| 7,277,084 B2* | 10/2007 | Hinckley | G06F 3/0362 345/163 |
| 8,587,521 B2 | 11/2013 | Zielke et al. | |
| 2007/0146324 A1 | 6/2007 | Blandin et al. | |
| 2007/0200826 A1 | 8/2007 | Zeng et al. | |
| 2013/0311939 A1* | 11/2013 | Hsu | G06F 3/0485 715/784 |

* cited by examiner

COMPUTER INPUT DEVICE WITH SMART SCROLL

TECHNICAL FIELD AND BACKGROUND

The present description, drawings and claims relate to a computer input device, and more particularly to a computer input device such as a computer mouse with a scroll function. Nowadays, using a computer mouse with a scroll device (e.g., a scroll wheel or a scroll pad) provides a simple means for navigating up, down, to the left or the right in a content, folder or document presented on a computer screen. Generally, a conventional mouse communicates with a host computer via a USB cable or a wireless interface, such as Bluetooth®. The so-called "scrolling" function in applications is mentioned in U.S. Pat. No. 5,530,455, referring to a roller-like device included at the top of a computer mouse. Once the roller is rotated by a user's finger, the non-displayed portion of an application or document can be displayed line-by-line or page-by-page. A rapid turning of the roller generates pulses which are stored in a buffer and interpreted as a scroll command so that scrolling continues until stopped or until the buffer is depleted.

When using a conventional mouse with a scroll wheel, one-step turning of the scroll wheel may result in one-line or several-line scrolling of screen content on a computer display, depending on the computer system and the system configuration. Thus, when a user needs to scroll through a long document or to do a fast browsing, the scroll wheel has to be turned numerous times. This is inconvenient for the user. Allowing both precise repositioning actions as well as rapid movement across large distances are conflicting requirements. Scrolling has a wide range of control requirements: from small precise pixel targeting to long range movement. Many scrolling input devices, however, allow only coarse levels of control. The range of physical movement enabled by most mouse scroll wheels is approximately 10 mm linearly (without temporarily disengaging from the wheel in order to reposition the finger). In addition, this movement is discretized into a small number of coarse 'notches'. Documents can be hundreds of pages long, with each page containing roughly a thousand linear pixels, any of which could be a target for positioning the scrolled display. Therefore, standard notched scroll wheels are best used only for short range movement, and when longer movements are required users switch to an alternative control, such as dragging a scroll thumb of a vertical or horizontal scroll bar. Such a distance-based choice between scrolling methods is inefficient as it takes time, can be incorrect, and requires the user to switch their attention from the task to the interface. Thus, users may avoid the decision and use the scroll wheel for long distances, even when this takes far longer than using the thumb of the scroll bar. Since scroll wheels are wide-spread, it is reasonable to expect that these controls should be usable for reaching near targets as efficiently as far targets. Conventional scrolling devices report raw events corresponding to the degree of a user's manipulation, which is translated into a magnitude of movement (measured in number of lines or pixels) by software device drivers execute in the host computer. The software device drivers can also attend to the reported value and the time since the last event and use these to apply transformations to the device events.

Andy Cockburn et al, in "Improving Scrolling Devices with Document-Length-Dependent Gain", CHI 2012, May 5-10, 2012, Austin, Tex., USA. ACM 978-1-4503-1015-Apr. 12, 2005, discloses that document-length dependent gain can improve performance with scrolling devices. However, this approach requires data exchange of the document length from the high level program (text processor, web browser, spreadsheet program, operating system, or the like) and the mouse software device driver executed in the host computer.

Logitech's MicroGear Precision Scroll Wheel (see "Innovation Brief: Logitech MicroGear™ Precision Scroll Wheel and SmartShift™ Technology" (source: http://www.logitech.com/lang/pdf/ib-microgear_and_smartshift_EN.pdf) is a mechanical concept for navigating documents etc. that operates in two distinct modes. In a free-spin mode, a ratchet-scrolling mechanism retracts, allowing the wheel to spin for several seconds to provide frictionless long-distance scrolling. In its normal click-to-click mode, the wheel allows to navigate small distances with great precision, such as individual spreadsheet rows, or small vertical distances in a document or Web page. Switching between the two modes is either done manually or managed automatically. To free-spin, a 14-gram metal wheel cooperates with a ratcheting hub. To shifting into fast mode requires nearly a hundred mechanical components, including a low-power motor to retract the ratcheting mechanism for free-spinning. When a text document is the user's focus, the wheel defaults to free-spin mode, but is set to click-to-click mode by the software driver when the user is navigating photos in a photos folder. For spreadsheets, the software driver also senses the speed at which the wheel is spun. If it is spun fast, the wheel is put into free-spin mode; if the wheel is spun more slowly, the software driver causes the wheel to shift into click-to-click mode. With the ratchet mechanism disengaged, the scroll wheel can spin freely, allowing to scroll great distances fast. As the wheel comes to a stop, the cam rotates in the opposite direction, reengaging the ratchet mechanism and returning the mouse to normal operation.

U.S. Pat. No. 8,587,521 B2 refers to a computer mouse that notifies a mouse driver in the host computer whenever a scroll event occurs as a result of rotation of a scroll wheel. In response to receiving a notification of a scroll event, the mouse driver adjusts a stored value that represents inertia calculated based on elapsed time between scroll events. The computer scrolls a number of lines on a display, the number being based on the stored value. When the stored value does not represent zero inertia and upon a predetermined amount of time elapsing without occurrence of a scroll event, the computer scrolls a second number of lines on the display. The second number is based on the stored value. The mouse driver adjusts the stored value so as to represent a decrease in inertia.

US 20070200826 A1 refers to an input device that includes a body and a trace-detecting module coupled to the body. The body has a micro control unit (MCU), and the trace-detecting module has a light pervious area, and a trace-detecting unit. The trace-detecting unit has a light source and a sensor. The sensor senses changes in a reflected light beam caused by movement of a user's digit on the light pervious area at a velocity which can be sensed by the sensor. If the velocity exceeds a threshold stored in the MCU, the MCU executes automatic scrolling at a predetermined scrolling speed.

US20070146324 refers to further prior art useful as background for understanding the concept presented herein.

Problem

The various concepts in the prior art fail to provide the user with a cost-efficient, ergonomic solution in a mouse device that uses a conventional scroll wheel to achieve a smart scroll wheel behaviour.

Solution

The scrolling functionality disclosed here as a method of scrolling as well as an input system comprising a human-machine interface device comprising a scroll device is defined in the respective independent method and apparatus and computer program code carrier claims.

The present solution devises a method for scrolling through contents on a display of a host computer. It includes the steps of: sensing, in a sequence of scroll pulses, elapsed time spans between each of a plurality of the scroll pulses resulting from a user operating a scroll device being a part of a human-machine interface device which is adapted to communicate with the host computer, and a direction of the operation of the scroll device by the user; upon sensing elapsed time spans following a first scroll pulse until a subsequent scroll pulse is sensed, carrying out the following: identifying a 'single scroll' or a 'fast scroll', depending on the elapsed time between subsequent scroll pulses; upon identifying a 'single scroll', issuing a single scroll event by a controller residing in the human machine interface device to initiate a single scroll command in the host computer; upon identifying a 'fast scroll', issuing a predetermined number of single scroll events by the controller of the human-machine interface device to initiate a respective number of scroll commands in the host computer with predetermined time spans between subsequent scroll events; wherein the predetermined number of single scroll events is based on a value stored in the human-machine interface device, and wherein the predetermined time spans between subsequent scroll events being defined by a function or table of time span values stored in the human-machine interface device. Upon sensing a scroll pulse having a reversed direction of the operation of the scroll device compared to a preceding direction of the operation of the scroll device, or an operation of an input sensor of the human-machine interface device while issuing the predetermined number of single scroll events, the method, in one variant, may immediately cease to issue any further single scroll events of the number of single scroll events by the controller of the human-machine interface device.

The identifying a 'single scroll' may include measuring an elapsed time after a scroll pulse exceeding a first time value before a subsequent scroll pulse is detected; and the identifying a 'fast scroll' may include an elapsed time after a scroll pulse not exceeding the first time value before a subsequent scroll pulse is detected, wherein the first time value is stored in the human machine interface device.

The issuing of a single scroll event can be adapted to initiate a scroll command in the host computer by a number of lines, columns or pixels for the contents presented on the display in the detected direction of the operation of the scroll device, the number being based on a value stored in the host computer.

An input system as suggested here comprises a human machine interface device comprising a scroll device adapted to feed scroll pulses to a controller residing in the human machine interface device, for scrolling through contents on a display of a host computer. The controller is adapted and programmed to communicate with the host computer and adapted and programmed to sense, in a sequence of scroll pulses, elapsed time spans between each of a plurality of the scroll pulses resulting from a user operating a scroll device being a part of a human-machine interface device which is adapted to communicate with the host computer, and a direction of the operation of the scroll device by the user. The controller is further adapted and programmed to, upon sensing elapsed time spans following a first scroll pulse until a subsequent scroll pulse is sensed, carry out the following: identifying a 'single scroll' or a 'fast scroll', depending on the elapsed time between subsequent scroll pulses; upon identifying a 'single scroll', issuing a single scroll event by a controller residing in the human machine interface device to initiate a single scroll command in the host computer; the controller is also adapted and programmed to, upon identifying a 'fast scroll', issuing a predetermined number of single scroll events by the controller of the human-machine interface device to initiate a respective number of scroll commands in the host computer with predetermined time spans between subsequent scroll events; wherein the predetermined number of single scroll events is based on a value stored in the human-machine interface device, and wherein the predetermined time spans between subsequent scroll events being defined by a function or table of time span values stored in the human-machine interface device. Upon sensing a scroll pulse having a reversed direction of the operation of the scroll device or an operation of an input sensor of the human-machine interface device while issuing the predetermined number of single scroll events, in one variant of the input system, may immediately cease to issue any further single scroll events of the predetermined number of single scroll events by the controller of the human-machine interface device.

Further, a machine-executable software program code provided on a software program code carrier and adapted and intended to be executed by a controller residing in a human machine interface device comprising a scroll device adapted to feed scroll pulses to the controller, for scrolling through contents on a display of a host computer, wherein the software program code is adapted and programmed to cause the controller to carry out the above-described steps.

Further Features, Characteristics and Advantages

The scroll device used in the present solution can be a conventional mechanical or optomechanical scroll wheel or a scroll pad, or the like. In the case of a (opto-) mechanical scroll wheel, haptic feedback is inherent; in the case of a touch/motion sensitive scroll pad, a vibrator device is to be included in order to also provide a haptic feedback to the user.

The present solution allows a user to have in the same device both the functionality of a single scroll (with haptic feedback) for precise content navigation, and fast scroll through a smart and ergonomic implementation of a free-spinning scroll wheel for navigating though large amounts of content smoothly.

The present solution does not require additional hardware or software on the host computer. This saves money and avoids any impact the host computer resources (CPU, memory). In addition, no specific device driver software needs to provide the user with this additional smart scrolling functionality, which saves the user time.

The present solution also saves extra effort on the device manufacturer's part by not having to develop individual driver solutions for multiple platforms (Apple OS X, Linux, Microsoft Windows, Google Android, Google Chromium OS, etc.).

This is achieved by integrating the low level signal processing as well as the high level signal communication in the human-machine interface device. To this end, the present solution uses the signals from the wheel encoder which are only available in the device in a way that allows for both a step-by-step or single scrolling and a free-spinning or fast scroll. In addition, these signals are also used to model the behaviour of a "free-spinning" wheel or fast scroll in a more ergonomic fashion.

In this respect, it has been found that an actual free-spinning wheel does not generate the scrolling signals in a user-friendly fashion. The required inertial behavior can only be approximated by real physical inertial wheels having a relatively high mass. This is counter-productive for single scrolling and deteriorates the precision of the navigation. In addition, the user who needs to operate the high-mass wheel experiences fatiguing of his/her finger. Also, in order to accurately distinguish between the single scrolling and the fast scrolling, the operational speed threshold for identifying the "free-spinning" mode of the inertia wheel needs to be relatively high. In this case of a "free-spinning" mode with a high rotational speed, it is difficult for the user to follow e.g. the flow of the content on the computer screen.

In contrast thereto, the present solution allows for a smart and user-oriented modeling of the scrolling speed independently from the physical properties of an inertial wheel and the friction of its bearings. Thus, while the threshold to change from single scroll to the fast scroll can be set to a secure level, the subsequent speed or rate at which the scroll events are issued by the controller in the human-machine interface device can be set independently from the actual activation speed of the fast scroll operation. Further, electrical signals from other input sensors of the human-machine interface device (e.g. mouse buttons or the directional signals of the scroll wheel) can be used to stop the fast scroll operation mode. This improves the user experience in a way that cannot be replicated just by hardware without a very complex and expensive construction.

Essentially, the entire smart scrolling solution presented here resides in the controller of the human-machine interface device instead of processing the high level scroll event signals in the host computer. This has numerous implications on the signal processing side which translate into advantages for the user.

The smart scrolling solution presented here allows for a meticulous parameterization of the trigger gesture to allow users to use the single scroll step mode without unwantedly triggering the fast or smart scrolling mode.

Irrespective of the speed to switch from slow scroll to fast scroll, the present solution allows and in certain embodiments also provides for an initial slow start of the scrolling speed in the fast scroll mode to avoid confusing users with a very fast and sudden scrolling.

The smart scrolling solution presented here allows and in certain embodiments also provides for an increase of the scrolling speed in the fast scroll mode, while conventional so-called inertia scroll wheels always and inevitably have a decreasing scrolling speed.

The smart scrolling solution presented here also allows and in certain embodiments also provides for an instantaneous stop of the fast scroll mode when the user operates the scroll device in the opposite direction or if a human-machine interface device button is pressed.

Also, the features and parameters defining the smart scrolling operation such as the elapsed time spans between subsequent scroll pulses to distinguish the 'single scroll' mode from the 'fast scroll' mode, in the 'fast scroll' mode, the predetermined number of single scroll events and the predetermined time spans between subsequent scroll events, can be modified and adapted to user preferences by the driver software running on the host computer. The conversion of scroll events e.g. into lines moves or page moves in the application program is predefined by an end-user in the device driver of the operating system. That conversion is the same regardless if the end-user has moved the wheel to generate a single scroll event or if the device has detected a "fast scroll". As such, conversion of scroll events into lines will depend on a configurable option.

The number of scroll events that are issued by the device after the detection of the "fast scroll" is determined from a function or simply predetermined. In one embodiment, the determination function for the number of scroll events that are issued by the device is dependent from the rotational speed of the scroll wheel exerted by the user operating the scroll wheel.

The signals from the scroll device in the human-machine interface device are directly processed in the controller to identify a 'single scroll' or a 'fast scroll' mode and to issue the respective number of scroll events with the desired timing. Subsequently, high level (e.g. USB) signals are communicated to the host computer where they decoded and handed over to the application program. This contrasts to the conventional approach which directly encodes the signals from the wheel sensor in the mouse into high level USB signals. These high level USB signals are sent to the host computer where they may be processed in an inertia algorithm and then handed over to the application program.

The solution presented here has less latency and is able to provide the application program faster with the intended scroll command as the prior art. As a consequence, the user experiences a more agile response of the application program. The conventional, individual processing and transforming of the scroll signals into high level USB signals in the mouse, communicating the high level signals to the host computer, decoding these signals in the device driver and generating scroll event signals for the application program is very time consuming and reduces the responsive-time to user actions invoked on a conventional mouse.

Additional features and advantages of the solutions disclosed herein are set forth in the description which follows, and in part will be evident from the description, or may be learned by practice of the described technologies. The features and advantages of the concepts may be realized and obtained by means of the instruments and combinations particularly pointed out in the appended claims.

Figure 1:
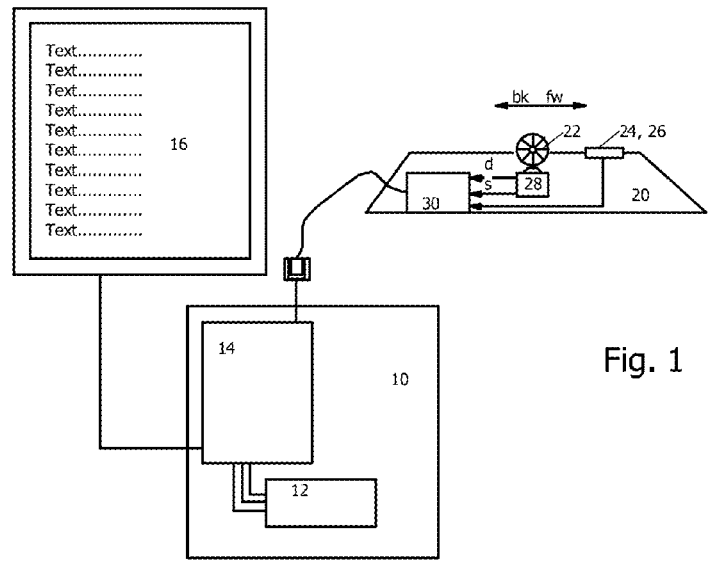
FIG. 1 shows a human-machine interface device in the form of a mouse.

FIG. 1 shows an exemplary human-machine interface device in the form of a mouse 20. This mouse is provided with a scroll wheel 22 and several mouse buttons 24, 26. The scroll wheel 22 is operably connected to a rotational sensor 28 such as a rotary encoder (http://www.ttc-switch.com/en/products.aspx?cid=30) to measure the wheel rotation direction (d) and wheel rotation speed (s). The rotational sensor 28 provides also a mechanical click to experience a click when scrolling the scroll wheel 22. The outputs of the rotational sensor 28 are connected to input lines of a controller 30 such as an ATMEL microcontroller. The controller 30 of the mouse 20 is connected via a cable with connectors to a host computer 10. For example, the controller 30 can operate on its output side to run a protocol for a wireless network such as Bluetooth®, a USB network or any other network that allows the mouse 20 to be connected to the host computer 10. The host computer 10 includes a memory 12, a processor 14 and is connected to a display device 16 to present contents (i.e. a document, web page, spreadsheet, CAD file, file folder, photo, or the like) in lines, columns or pixels to a user.

Figure 2:
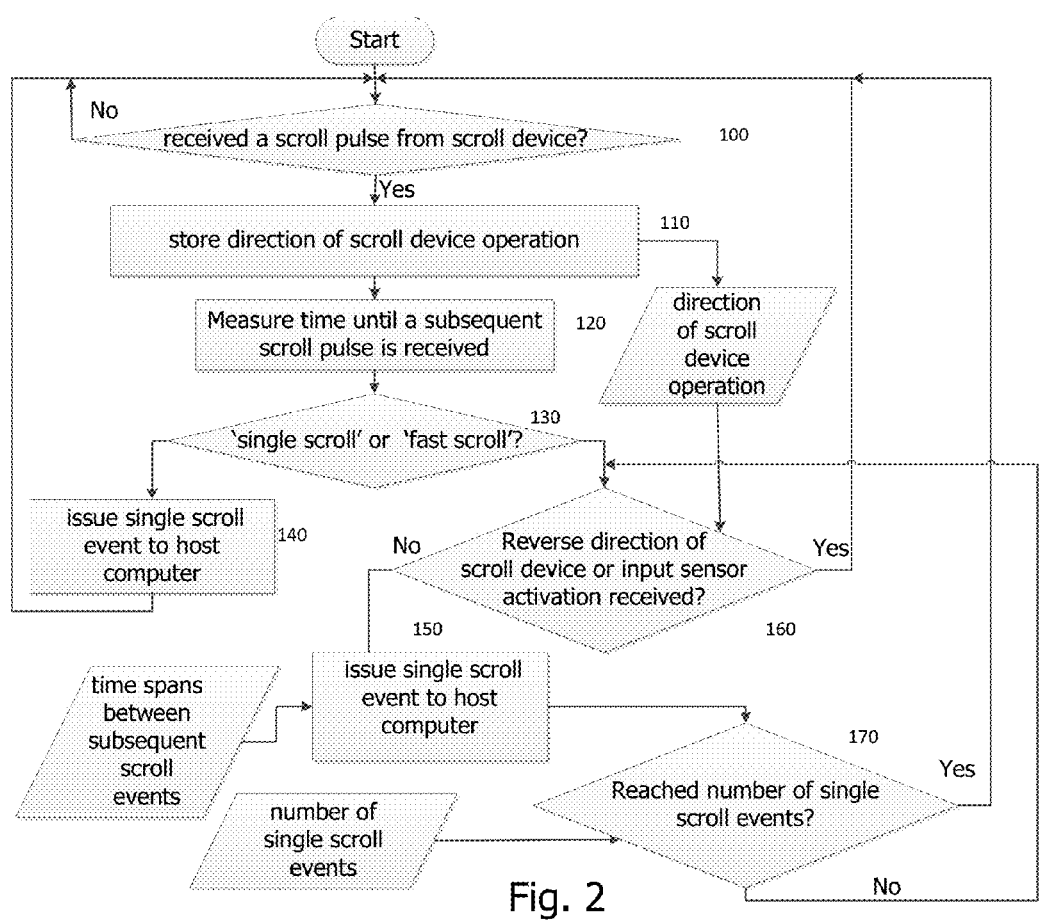
FIG. 2 is a software flowchart of the software code of the mouse including a scroll wheel function.

As illustrated by FIG. 2, the controller 30 residing in the mouse 20 includes software code for the mouse 20 including a scroll wheel function.

After the start of the execution of this program in the controller 30 of the mouse 20, the first step 100 performs a receiving of scroll pulses. Once a scroll pulse has been received, a direction fw, bk of the operation of the scroll device 22 by the user is received and stored in step 110. In step 120, in a sequence of scroll pulses, elapsed time spans between each of a plurality of the scroll pulses resulting from a user operating a scroll device 22 are sensed. Once a subsequent scroll pulse is sensed and the elapsed time spans between a first scroll pulse and a subsequent scroll pulse has been determined in step 120, a determination is made whether the user wishes a 'single scroll' or a 'fast scroll' in step 130, depending on the elapsed time between subsequent scroll pulses. If a 'single scroll' has been identified, a single scroll event is issued by the controller 30 to initiate a single scroll command in the host computer 10 in step 140. If a 'fast scroll' has been identified, a predetermined number nss of single scroll events is issued by the controller 30 to initiate a respective number of scroll commands (step 150) in the host computer 10 with predetermined time spans ts between subsequent scroll events. The predetermined number nss of single scroll events is based on a value stored in the mouse 20, and the predetermined time spans ts between subsequent scroll events is also defined by table of time span values stored in the mouse 20.

This table can have the following structure and contents: In one example, nss=30

| # of scroll event | time span |
|---|---|
| 1 | 10 ms |
| 2 | 10 ms |
| 3 | 10 ms |
| 4 | 2 ms |
| ... | 2 ms |
| 27 | 10 ms |
| 28 | 100 ms |
| 29 | 150 ms |
| 30 | 400 ms |

It is understood that longer tables with a larger number of scroll events and a different attribution of time spans between the respective intervals are possible. This allows for a very user-friendly and effective smart scrolling function that cannot be achieved by real physical inertial wheels.

Figure 3:
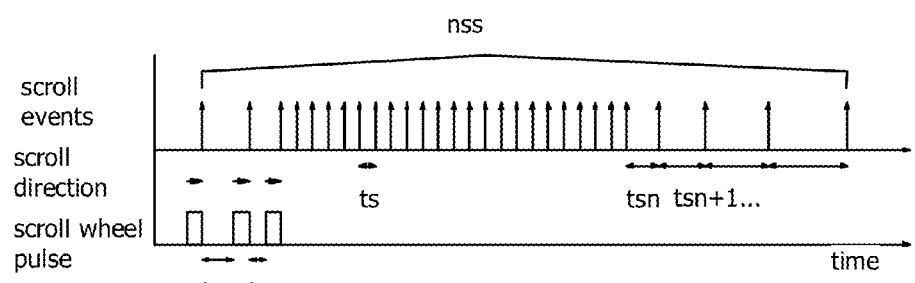
FIGS. 3 and 4 are timing diagrams illustrating different operational scenarios of the human-interface device of FIG. 1 implementing the software of FIG. 2.

The above time span table means that initially (events 1-3) the scroll events are effected in 10 ms intervals. Thereafter (events 4-27), the scroll events are effected very fast in 2 ms intervals. Towards the end (events 28-30), the time interval between subsequent scroll events extend significantly from 10 ms to 400 ms, respectively. This scenario is shown in FIG. 3. In another variant, the individual time spans of the table are scaled by the rotational speed of the scroll wheel operated by the user. Also, the phases of the different time spans (initial slow phase, middle fast phase, final tapering off phase) can have different—relative to each other as well as absolute—lengths, and their order can also be changed, e.g. to initial fast phase, middle slow phase, final tapering off phase.

Figure 4:
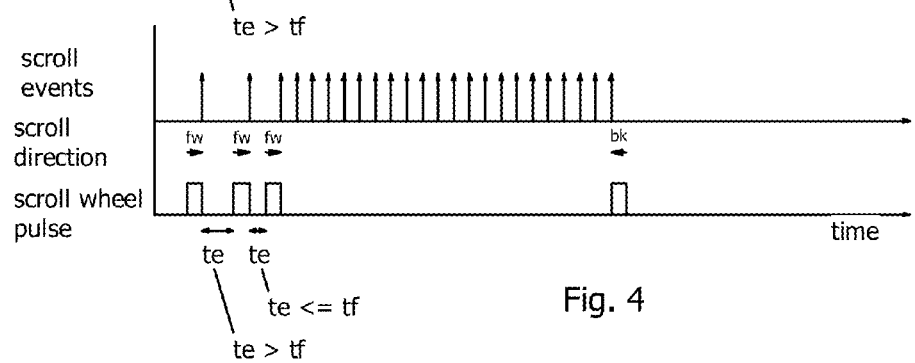

If however, before the predetermined number nss of single scroll events is has been reached (step 170), the user turns the scroll wheel into the opposite direction (step 160), the controller 30 immediately ceases to issue any further single scroll events of the predetermined number of single scroll events. This scenario is shown in FIG. 4.

Embodiments within the scope of the present solution may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer executable instructions also include program modules that are executed by digital processors or signal processors in stand-alone or network environments. Generally, program modules include routines, programs, objects, components, and data structures that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

A reader skilled in the art will appreciate that other embodiments may be practiced in network computing environments with many types of computer system configurations, including personal computers, hand-held devices, multiprocessor systems, microprocessor-based or programmable consumer electronics, network PCs, mini-computers, mainframe computers, cloud infrastructure, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices. Communication at various stages of the described system can be performed through a network cloud such as a local area network, a token ring network, the Internet, a corporate intranet, 802.11 series wireless signals, fiber-optic network, radio or microwave transmission, etc. Although the underlying communication technology may change, the fundamental principles described herein are still applicable.

The various embodiments described above are provided by way of illustration only and should not be construed to limit the invention. For example, the principles herein may be applied to a piece of software code accessible wirelessly by a portable media playback device or by a personal computer physically connected to a network. Those skilled in the art will readily recognize various modifications and changes that may be made to the present solution without following the example embodiments and applications illustrated and described herein, and without departing from the scope of the present disclosure.

What we claim is:

1. A method for scrolling through contents on a display of a host computer, comprising the steps of:
    sensing, in a sequence of scroll pulses,
        (i) elapsed time spans between each of a plurality of the scroll pulses resulting from a user operating a scroll device being a part of a human-machine interface device which is adapted to communicate with the host computer, and
        (ii) a direction of the operation of the scroll device by the user;
    upon sensing elapsed time spans following a first scroll pulse until a subsequent scroll pulse is sensed, carrying out the following:
    identifying a 'single scroll' or a 'fast scroll', depending on the elapsed time between subsequent scroll pulses;
    upon identifying a 'single scroll', issuing a single scroll event by a controller residing in the human machine interface device to initiate a single scroll command in the host computer; and
    upon identifying a 'fast scroll', issuing a plurality of single scroll events by the controller of the human-machine interface device to initiate a respective plurality of scroll commands in the host computer with predetermined time spans between subsequent scroll events; wherein the plurality of single scroll events is based on a value stored in the human-machine interface device, and wherein lengths of the predetermined time spans between successively-issued subsequent scroll events are tapered and are defined by a function or table of time span values stored in the human-machine interface device,
    wherein the conversion of each scroll event into lines or pages of the contents to be moved on the display is the same regardless for 'single scroll' or 'fast scroll'.

2. The method for scrolling through contents according to claim 1, wherein upon sensing (i) a scroll pulse having a reversed direction of the operation of the scroll device or (ii) an operation of an input sensor of the human-machine interface device while issuing the plurality of single scroll events, a step of immediately ceasing to issue any further single scroll events of the plurality of single scroll events by the controller of the human-machine interface device is carried out.

3. The method for scrolling through contents according to claim 1, wherein (i) identifying a 'single scroll' includes measuring an elapsed time after a scroll pulse exceeding a first time value before a subsequent scroll pulse is detected; and (ii) identifying a 'fast scroll' includes an elapsed time after a scroll pulse not exceeding the first time value before a subsequent scroll pulse is detected, wherein the first time value is stored in the human machine interface device.

4. The method for scrolling through contents according to claim 1, wherein the issuing of a single scroll event is adapted to initiate a scroll command in the host computer by a number of lines, columns or pixels for the contents presented on the display in the detected direction of the operation of the scroll device, the number being based on a value stored in the host computer.

5. The method for scrolling through contents according to claim 1, wherein, irrespective of the speed to switch from slow scroll to fast scroll, an initial slow start of the scrolling speed in the fast scroll is applied.

6. The method for scrolling through contents according to claim 1, wherein an increase of the scrolling speed in the fast scroll mode is provided.

7. The method for scrolling through contents according to claim 1, wherein a determination function for the plurality of scroll events that are issued by the device is dependent on the rotational speed of the scroll wheel exerted by the user operating the scroll wheel.

8. The method for scrolling through contents according to claim 1, wherein a determination function for the individual time spans between scroll events is dependent on the rotational speed of the scroll wheel exerted by the user operating the scroll wheel.

9. An input system comprising a human machine interface device comprising a scroll device adapted to feed scroll pulses to a controller residing in the human machine interface device, for scrolling through contents on a display of a host computer, wherein the controller is adapted and programmed to communicate with the host computer and adapted and programmed to:
    sensing, in a sequence of scroll pulses,
        (i) elapsed time spans between each of a plurality of the scroll pulses resulting from a user operating a scroll device being a part of a human-machine interface device which is adapted to communicate with the host computer, and
        (ii) a direction of the operation of the scroll device by the user;
    upon sensing elapsed time spans following a first scroll pulse until a subsequent scroll pulse is sensed, carrying out the following:
    identifying a 'single scroll' or a 'fast scroll', depending on the elapsed time between subsequent scroll pulses;
    upon identifying a 'single scroll', issuing a single scroll event by a controller residing in the human machine interface device to initiate a single scroll command in the host computer; and
    upon identifying a 'fast scroll', issuing a plurality of single scroll events by the controller of the human-machine interface device to initiate a respective plurality of scroll commands in the host computer with predetermined time spans between subsequent scroll events; wherein the plurality of single scroll events is based on a value stored in the human-machine interface device, and wherein lengths of the predetermined time spans between successively-issued subsequent scroll events are tapered and are defined by a function or table of time span values stored in the human-machine interface device, wherein the conversion of each scroll event into lines or pages of the contents to be moved on the display is the same regardless for 'single scroll' or 'fast scroll'.

10. The input system according to claim 9, wherein the controller is adapted and programmed to, upon sensing (i) a scroll pulse having a reversed direction of the operation of the scroll device or (ii) an operation of an input sensor of the human-machine interface device while issuing the plurality of single scroll events, immediately ceasing to issue any further single scroll events of the plurality of single scroll events by the controller of the human-machine interface device.

11. The input system according to claim 9, wherein, irrespective of the speed to switch from slow scroll to fast scroll, an initial slow start of the scrolling speed in the fast scroll is applied.

12. The input system according to claim 9, wherein an increase of the scrolling speed in the fast scroll mode is provided.

13. The input system according to claim 9, wherein a determination function for the plurality of scroll events that are issued by the device is dependent on the rotational speed of the scroll wheel exerted by the user operating the scroll wheel.

14. The input system according to claim 9, wherein a determination function for the individual time spans between scroll events is dependent on the rotational speed of the scroll wheel exerted by the user operating the scroll wheel.

15. A non-transitory software program code carrier having stored thereon machine-executable software program code adapted and intended to be executed by a controller residing in a human machine interface device comprising a scroll device adapted to feed scroll pulses to the controller, for scrolling through contents on a display of a host computer, wherein the software program code is adapted and programmed to cause the controller to carry out the following steps:
  sensing, in a sequence of scroll pulses,
    (i) elapsed time spans between each of a plurality of the scroll pulses resulting from a user operating a scroll device being a part of a human-machine interface device which is adapted to communicate with the host computer, and
    (ii) a direction of the operation of the scroll device by the user;
  upon sensing elapsed time spans following a first scroll pulse until a subsequent scroll pulse is sensed, carrying out the following:
  identifying a 'single scroll' or a 'fast scroll', depending on the elapsed time between subsequent scroll pulses;
  upon identifying a 'single scroll', issuing a single scroll event by a controller residing in the human machine interface device to initiate a single scroll command in the host computer; and
  upon identifying a 'fast scroll', issuing a plurality of single scroll events by the controller of the human-machine interface device to initiate a respective plurality of scroll commands in the host computer with predetermined time spans between subsequent scroll events; wherein the plurality of single scroll events is based on a value stored in the human-machine interface device, and wherein lengths of the predetermined time spans between successively-issued subsequent scroll events are tapered and are defined by a function or table of time span values stored in the human-machine interface device, wherein the conversion of each scroll event into lines or pages of the contents to be moved on the display is the same regardless for 'single scroll' or 'fast scroll'.

16. The non-transitory software program code carrier according to claim 15, being further adapted and programmed to cause the controller to carry out the following steps:
  upon sensing (i) a scroll pulse having a reversed direction of the operation of the scroll device or (ii) an operation of an input sensor of the human-machine interface device while issuing the plurality of single scroll events, immediately ceasing to issue any further single scroll events of the plurality of single scroll events by the controller of the human-machine interface device.

17. The non-transitory software program code carrier according to claim 15, wherein, irrespective of the speed to switch from slow scroll to fast scroll, an initial slow start of the scrolling speed in the fast scroll is applied.

18. The non-transitory software program code carrier according to claim 15, wherein an increase of the scrolling speed in the fast scroll mode is provided.

19. The non-transitory software program code carrier according to claim 15, wherein a determination function for the plurality of scroll events that are issued by the device is dependent on the rotational speed of the scroll wheel exerted by the user operating the scroll wheel.

20. The non-transitory software program code carrier according to claim 15, wherein a determination function for the individual time spans between scroll events is dependent on the rotational speed of the scroll wheel exerted by the user operating the scroll wheel.

* * * * *